(12) United States Patent
Gao et al.

(10) Patent No.: US 11,163,464 B1
(45) Date of Patent: Nov. 2, 2021

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Jian Gao, Beijing (CN); Rongrong Shang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/990,331

(22) Filed: Aug. 11, 2020

(30) Foreign Application Priority Data

Apr. 30, 2020 (CN) .......................... 202010366965.8

(51) Int. Cl.
*G06F 3/06* (2006.01)

(52) U.S. Cl.
CPC .......... *G06F 3/0631* (2013.01); *G06F 3/0619* (2013.01); *G06F 3/0689* (2013.01); *G06F 2211/1083* (2013.01); *G06F 2212/262* (2013.01)

(58) Field of Classification Search
None
See application file for complete search history.

(56) References Cited

U.S. PATENT DOCUMENTS

| | | | | |
|---|---|---|---|---|
| 7,958,304 | B1* | 6/2011 | Goel ................... | G06F 11/1096 711/114 |
| 10,126,988 | B1* | 11/2018 | Han ....................... | G06F 3/0619 |
| 2007/0180190 | A1* | 8/2007 | Li .......................... | G06F 3/0632 711/114 |
| 2014/0325146 | A1* | 10/2014 | Madhusudana ....... | G06F 3/0689 711/114 |
| 2015/0378637 | A1* | 12/2015 | Takamura ............. | G06F 3/0631 711/114 |
| 2016/0092109 | A1* | 3/2016 | Wu ....................... | G06F 3/0689 711/114 |
| 2019/0073131 | A1* | 3/2019 | Khurange ............. | G06F 3/0619 |
| 2019/0294349 | A1* | 9/2019 | Hsieh .................... | G06F 3/0683 |

\* cited by examiner

*Primary Examiner* — Kaushikkumar M Patel
(74) *Attorney, Agent, or Firm* — BainwoodHuang (57) ABSTRACT

Techniques for storage management involve: acquiring capacities of a plurality of disks configured to provide redundant storage; determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity. Accordingly, an optimal disk configuration scheme can be selected to generate an optimal disk group, so as to improve storage capability and storage management efficiency.

15 Claims, 8 Drawing Sheets

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN202010366965.8, on file at the China National Intellectual Property Administration (CNIPA), having a filing date of Apr. 30, 2020, and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to computer technologies, and in particular, to a method, an electronic device, and a computer program product for storage management.

BACKGROUND

In the field of storage technologies, a storage system includes a large number of independent disks each divided into a plurality of disk slices, for example, 4-GB disk slices. A specified number of disk slices may form a small redundant array of independent disks (RAID), such as 4+1 RAIDS. Reliability of the RAID may be evaluated using a reliability model. In order to achieve high reliability of the RAID, the disk slices need to be allocated among a limited number of disks. Thus, the disks in the storage system need to be grouped, so as to allocate the disk slices in a disk group including a limited number of disks.

SUMMARY OF THE INVENTION

A method, an electronic device, and a computer program product for storage management are provided in the embodiments of the present disclosure.

In a first aspect of the present disclosure, a method for storage management is provided. The method includes: acquiring capacities of a plurality of disks configured to provide redundant storage; determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity.

In a second aspect of the present disclosure, an electronic device is provided. The device includes at least one processing unit and at least one memory. The at least one memory is coupled to the at least one processing unit and stores instructions configured to be executed by the at least one processing unit. When executed by the at least one processing unit, the instructions cause the device to perform actions including: acquiring capacities of a plurality of disks configured to provide redundant storage; determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity.

In a third aspect of the present disclosure, a computer program product is provided. The computer program product is tangibly stored in a non-transitory computer-readable medium and includes machine-executable instructions. When executed, the machine-executable instructions cause a machine to perform actions including: acquiring capacities of a plurality of disks configured to provide redundant storage; determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, identical reference numerals generally represent identical members.

In the drawings, identical or corresponding reference numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. The preferred embodiments of the present disclosure are shown in the accompanying drawings. However, it should be understood that the present disclosure may be implemented in various forms and should not be limited by the embodiments described here. Conversely, the embodiments are provided to make the present disclosure more thorough and complete and to enable the scope of the present disclosure to be fully conveyed to those skilled in the art.

The term "include" and its variants as used herein indicate open inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, in order to achieve high reliability of a storage array, disks need to be grouped, so as to allocate disk slices in a disk group. For example, a maximum number of disks, such as 25 disks, that can be included in each disk group may be specified. In this case, if the number of disks is greater than the specified number, more than one disk group needs to be created. For example, assuming that there are 26 disks, two disk groups will be created.

Conventionally, when a disk group is generated, all normal disks in the storage system will be used. In case that some disks fail, reduction of the number of the normal disks may result in merging of disk groups. However, the merging of the disk groups may result in an increase in a total capacity. In case that a failed disk is recovered to normal, it may be impossible to add it back to the disk group. This is because, if the disk is added, a total capacity of a newly generated disk group will be less than that of the old disk group, and therefore, the old disk group will be selected to be reserved. Thus, in this case, the storage system cannot add the recovered disk back to the disk group.

According to an example embodiment of the present disclosure, an improved solution for storage management is proposed. In the solution, capacities of a plurality of disks configured to provide redundant storage are acquired, and a first total capacity corresponding to a first candidate scheme of the redundant storage and a second total capacity corresponding to a second candidate scheme of the redundant storage are determined based on the capacities of the plurality of disks. All of the plurality of disks are used in the first candidate scheme, and a part of the plurality of disks are used in the second candidate scheme. Therefore, a target scheme of the redundant storage is determined from the first candidate scheme and the second candidate scheme based on the first total capacity and the second total capacity.

In this way, an optimal disk configuration scheme can be selected according to this solution to flexibly generate an optimal disk group by using all or some of the disks, thus achieving a maximum total capacity of the disk group. This can prevent an increase in the capacity caused by the merging of the disk groups after some disks fail, thus avoiding a situation that a disk cannot be added back to the disk group when the disk is recovered. Therefore, according to the solution, storage capability can be improved, efficiency and reliability of storage management can be improved, and better user experience can be provided.

Figure 1:
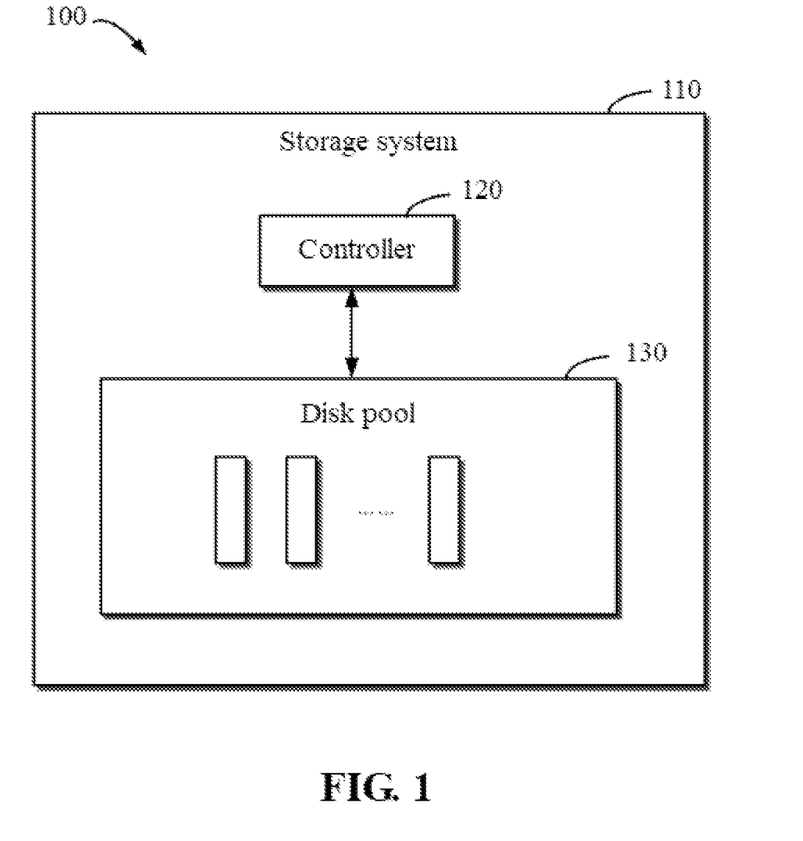
FIG. 1 is a schematic diagram of an example of a storage management environment according to some embodiments of the present disclosure.

In the following, specific examples of the solution will be described in more detail with reference to FIG. 1 to FIG. 8. FIG. 1 is a schematic diagram of an example of storage management environment 100 according to some embodiments of the present disclosure. Storage management environment 100 includes storage system 110 configured to store and manage data. Storage system 110 includes controller 120 and disk pool 130.

Disk pool 130 may include a plurality of disks. The disks in disk pool 130 may be of various types. For example, the disks may be a mechanical hard disk, a solid state drive (SSD) (such as an NVME SSD or an SAS SSD), and so on. A disk may be divided into a plurality of disk slices in a fixed size (for example, 4 GB). A predetermined number of disk slices from different disks may form a storage array. The storage array may provide a function of a RAID. For example, in the case of RAID5, five idle disk slices from different disks may be combined into a storage array.

As described above, in order to achieve high reliability of the storage array, the disk slices need to be allocated among a limited number of disks. Therefore, the disks in disk pool 130 need to be grouped, so as to allocate the disk slices in a disk group including a limited number of disks.

Controller 120 is configured to manage storage system 110, and more specifically, configured to group the disks in disk pool 130. Controller 120 may classify the disks into a plurality of disk groups. Each disk group may include a specified number of disks, for example, each disk group may include up to 25 disks, so as to ensure reliability of the storage array. Since each disk group belongs to a fault domain, this means that when a disk in a disk group fails, reliability of other disk groups will not be affected. Since each disk group belongs to a fault domain, all disk slices in a storage array should always come from the same disk group.

Compared with the conventional scheme of generating a disk group by using all available disks in disk pool 130, controller 120 flexibly selects all or some of the disks to generate an optimal disk group so as to achieve a maximum total capacity of the disk group. This can prevent an increase in the capacity caused by the merging of the disk groups after some disks fail, thus avoiding a situation that a disk cannot be added back to the disk group when the disk is recovered. Therefore, not only can a total storage capacity of the storage system be increased, but also efficiency and reliability of storage management can be improved.

Figure 2:
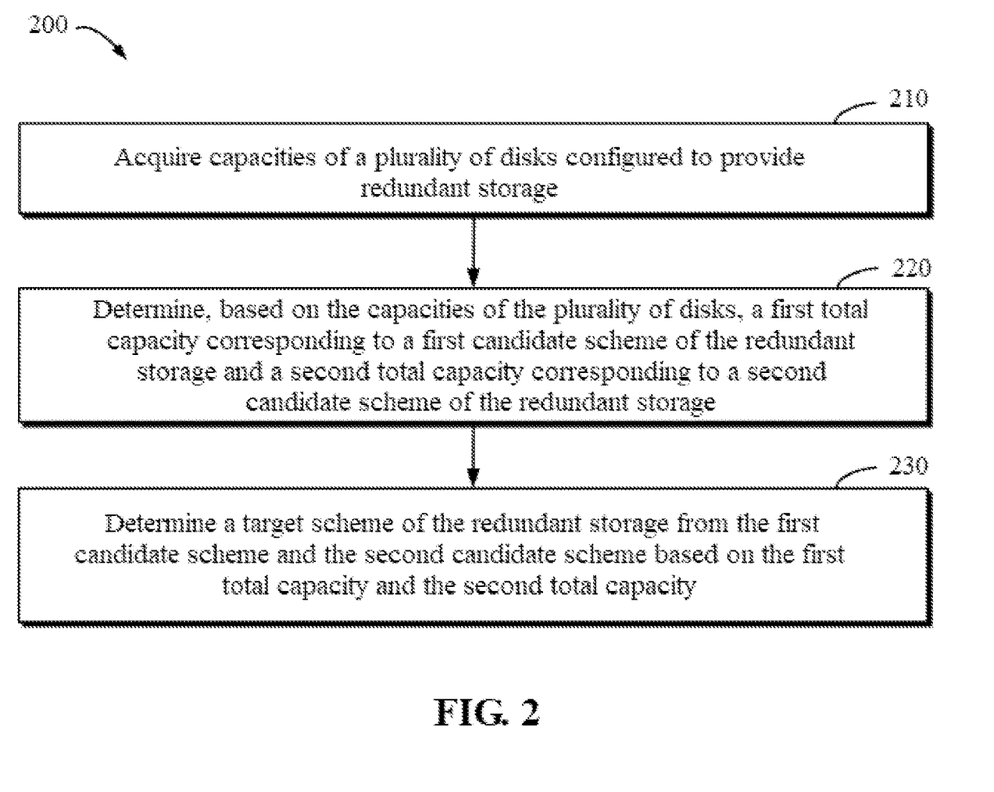
FIG. 2 is a flowchart of a method for storage management according to some embodiments of the present disclosure.

It should be noted that although controller 120 is shown to be implemented within storage system 110, alternatively, controller 120 can be implemented outside storage system 110, and its implementation location is not limited. Controller 120 may include, but is not limited to, any device having a computing power such as a cloud computing device, a mainframe computer, a server, a personal computer, a desktop computer, a laptop computer, a tablet computer, and a personal digital assistant. The operations performed by controller 120 will be described below in detail with reference to FIG. 2 to FIG. 6. FIG. 2 is a flowchart of method 200 for storage management according to some embodiments of the present disclosure. For example, method 200 may be performed by controller 120 as shown in FIG. 1. It should be understood that method 200 may also include additional steps not shown and/or may omit the steps shown, and that the scope of the present disclosure is not limited in this respect. For ease of understanding, method 200 will be described below with reference to FIG. 3 to FIG. 6.

In 210, controller 120 acquires capacities of a plurality of disks configured to provide redundant storage. In the context, the capacity refers to an effective capacity (alternatively referred to as "available capacity") of a disk. The available capacity is a capacity of a disk that can be configured to provide disk slices for a storage array. When there are not enough disks to meet width requirements of the storage array, the available capacity of the disk may be less than a physical capacity of the disk. In a disk group, a certain number of disk slices will be reserved to ensure that there is a sufficient spare storage space for data storage. This is to ensure that a storage array in the disk group can continue providing a data access service if a disk in the disk group is damaged and data in the disk group needs to be reconstructed into a spare storage space. For example, the size of the spare storage space may be equal to a maximum available capacity of a disk in the disk group.

Figure 3:
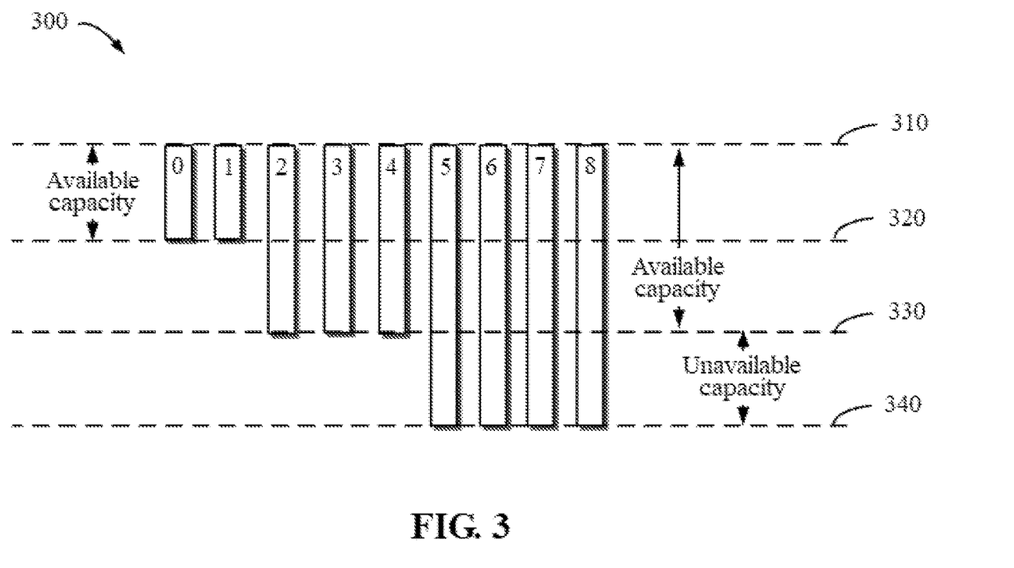
FIG. 3 illustrates an example of available capacities of disks according to some embodiments of the present disclosure.

FIG. 3 illustrates example 300 of available capacities of disks according to some embodiments of the present disclosure. As shown in FIG. 3, there are a total of 9 disks 0-8 in a disk group. The two disks 0-1 on the left are of the same type and have a minimum physical capacity, the three disks 2-4 in the middle are of the same type and have a medium physical capacity, and the four disks 5-8 on the right are of the same type and have a maximum physical capacity.

In RAID5 (4+1), a storage array needs to be created by using at least 6 disks (five disks and one spare disk). In this case, the portion defined by dotted lines 330 and 340 has only four disks 5-8, and therefore, this portion of disks 5-8 is an unavailable capacity. Based on this, an available capacity of each disk in disks 0-8 is as follows: available capacities of disks 1-2 are defined by dotted lines 310-320 respectively, available capacities of disks 2-4 are defined by dotted lines 310-330 respectively, and available capacities of disks 5-8 are defined by dotted lines 310-330 respectively.

Controller 120 may acquire the capacities of the plurality of disks in response to different conditions. In some embodiments, controller 120 may acquire the capacities of the plurality of disks if the plurality of disks are determined to be initialized. For example, it is assumed that there are 26 disks, including 6 NVME SSDs and 20 SAS SSDs. Controller 120 may acquire an available capacity of 1.7 T for each NVME SSD disk and an available capacity of 3.4 T for each SAS SSD disk when initializing the plurality of disks to generate a disk group. Alternatively, controller 120 may also acquire the capacities of the plurality of disks if it is determined that the number of active disks in the plurality of disks changes. For example, when an NVME SSD fails and is no longer active, controller 120 may need to regroup the plurality of disks. For this purpose, controller 120 may acquire the capacities of the plurality of disks.

In 220, controller 120 determines, based on the capacities of the plurality of disks, a total capacity (hereinafter referred to as "first total capacity") corresponding to a candidate scheme (hereinafter referred to as "first candidate scheme") of the redundant storage and a total capacity (hereinafter referred to as "second total capacity") corresponding to another candidate scheme (hereinafter referred to as "second candidate scheme") of the redundant storage. The first candidate scheme and the second candidate scheme are both schemes for selecting disks to generate a disk group. The first candidate scheme and the second candidate scheme are different in that all of the plurality of disks are used in the first candidate scheme, while a part of the plurality of disks are used in the second candidate scheme.

In some embodiments, in order to determine the first total capacity corresponding to the first candidate scheme, controller 120 may classify the plurality of disks into at least one disk group, determine an available capacity of the classified at least one disk group, and determine the first total capacity based on the determined available capacity. In addition, as described above, the disk group also needs to reserve a spare storage space. For this purpose, controller 120 may further determine a spare disk in the at least one disk group, and determine the available capacity based on the capacities of the disks other than the spare disk in the at least one disk group. In the following, how to determine the first total capacity will be described with reference to FIG. 4.

Figure 4:
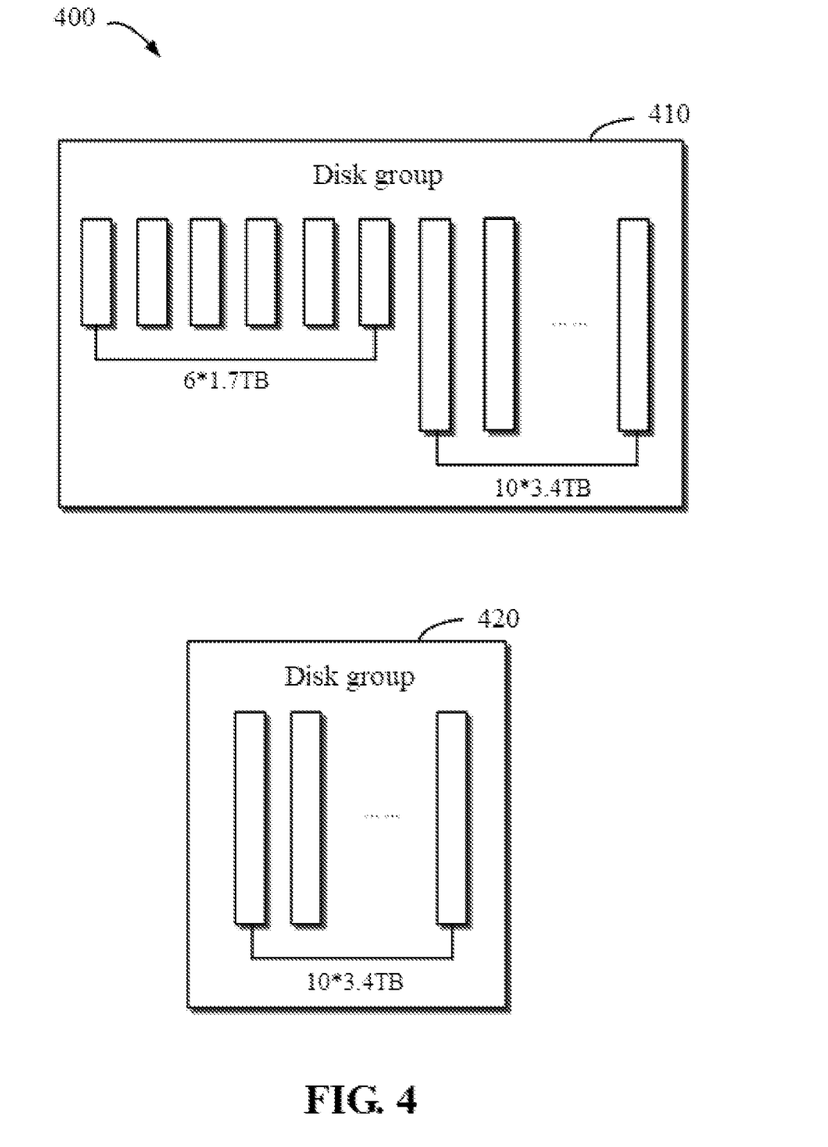
FIG. 4 illustrates an example of a first candidate scheme according to some embodiments of the present disclosure.

FIG. 4 illustrates example 400 of a first candidate scheme according to some embodiments of the present disclosure. As shown in FIG. 4, there are 26 disks, including 6 NVME SSD disks and 20 SAS SSD disks. An available capacity of each NVME SSD disk is 1.7 T, and an available capacity of each SAS SSD disk is 3.4 T. Since all the disks are used in the first candidate scheme, controller 120 may classify all the 26 disks into two disk groups 410 and 420 based on an appropriate classification method. Disk group 410 has 10 SAS SSD disks and 6 NVME SSD disks, among which one SAS SSD disk is used as a spare disk, and therefore, controller 120 can determine that its available capacity is 9×3.4 T+6×1.7 T=40.8 T. Disk group 420 has 10 SAS SSD disks, among which one SAS SSD disk is used as a spare disk, and therefore, controller 120 can determine that its available capacity is 9×3.4 T=30.6 T. Thus, controller 120 can sum the available capacities of the two disks 410 and 420, and obtain that the first total capacity is 40.8 T+30.6 T=71.4 T.

In addition, in some embodiments, in order to determine the second total capacity corresponding to the second candidate scheme, controller 120 may select a predetermined number of disks from the plurality of disks to form a disk group. The predetermined number is associated with a maximum number of disks that can be included in the disk group. For example, the predetermined number may be a maximum number of disks that can be included in the disk group, such as 25 disks. Similarly, controller 120 may determine a spare disk in the disk group and determine the second total capacity based on the capacities of the disks other than the spare disk in the disk group. In the following, how to determine the second total capacity will be described with reference to FIG. 5.

Figure 5:
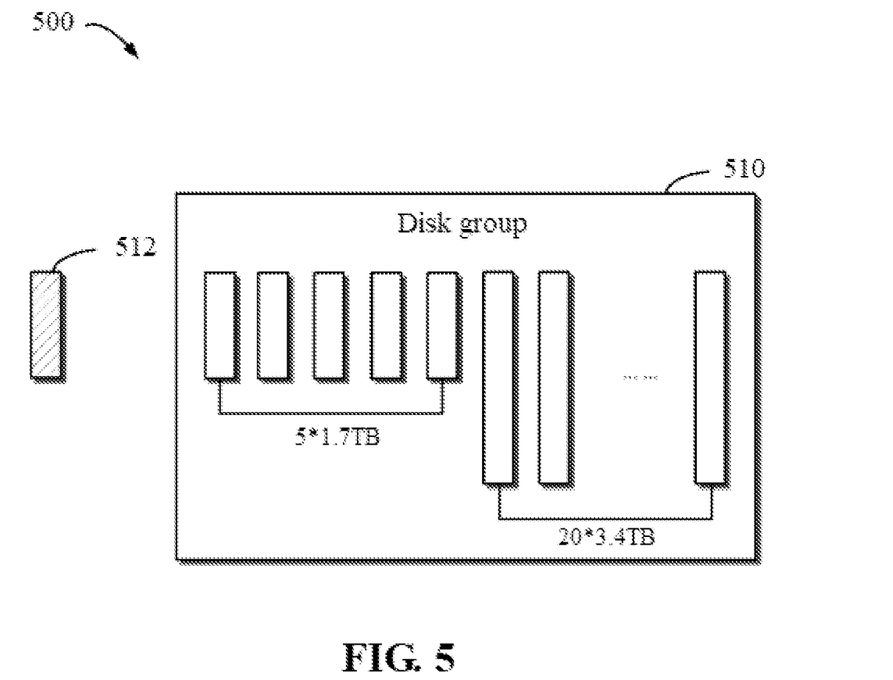
FIG. 5 illustrates an example of a second candidate scheme according to some embodiments of the present disclosure.

FIG. 5 illustrates example 500 of a second candidate scheme according to some embodiments of the present disclosure. Similar to FIG. 4, FIG. 5 illustrates 26 disks, including 6 NVME SSD disks and 20 SAS SSD disks. An available capacity of each NVME SSD disk is 1.7 T, and an available capacity of each SAS SSD disk is 3.4 T. Sine only a part instead of all of the disks may be used in the second candidate scheme, controller 120 may skip some of the disks. For example, controller 120 may skip the disks in order of the available capacities from small to large. Alternatively, controller 120 may also select to-be-skipped disks based on various attributes of the disks, such as read/write speed and stability. In some embodiments, the number of skipped disks may be a remainder of dividing a total number of disks by a maximum number of disks that can be included in each disk group, so that after the disks have been skipped, the remaining disks can be classified into an integer number of disk groups. In the example of FIG. 5, it is assumed that the maximum number of disks that each disk group can include is 25. Therefore, controller 120 may skip 1 disk (26%25=1), for example, disk 512, and select the remaining 25 disks to generate disk group 510.

Disk group 510 has 20 SAS SSD disks and 5 NVME SSD disks, among which one SAS SSD disk is used as a spare disk, and therefore, controller 120 can determine that its available capacity is 19×3.4 T+5×1.7 T=73.1 T. In the example of FIG. 5, since only one disk group 510 is generated, its available capacity is the second total capacity. Alternatively, when a plurality of disk groups are generated, controller 120 may also sum available capacities of the plurality of disk groups to obtain the second total capacity.

In 230, controller 120 determines a target scheme of the redundant storage from the first candidate scheme and the second candidate scheme based on the first total capacity and the second total capacity. For example, controller 120 may determine, from the first candidate scheme and the second candidate scheme, a scheme with a larger total capacity as the target scheme. For example, the first total capacity 71.4 T of the first candidate scheme is less than the second total capacity 73.1 T of the second candidate scheme, and therefore, the second candidate scheme is selected as the target scheme. That is to say, a disk group is generated using 20 SAS SSD disks and 5 NVME SSD disks, and one NVME SSD disk is skipped.

Further, controller 120 may also perform additional operations on the skipped disk. In some embodiments, controller 120 may record skipped disks by using a list. The list may include a variety of attributes associated with the skipped disks, such as the number of the skipped disks, types of the skipped disks, available capacities of the skipped disks, and IDs of the skipped disks.

In addition, controller 120 may also preferably skip new and idle disks rather than old and occupied disks. For example, controller 120 may skip occupied disks only in case that no appropriate idle disks are found. For this purpose, an occupation state ID may be set to indicate an occupation state of a disk. An occupation state ID of a new disk generally indicates idle, while an occupation state ID of an old disk generally indicates occupied.

In addition, an occupation state ID of a disk may vary with a change in an occupation state of the disk. In some embodiments, in case that an occupied disk is chosen to be skipped, disk slices on another disk will be reallocated to a storage array including disk slices located on the occupied disk. In case that data of the disk slices on the occupied disk is moved to the newly allocated disk slices, the occupied disk changes from occupied into idle, and the occupation state ID of the occupied disk also changes from occupied to idle. In this way, controller 120 provides good management for the skipped disk by recording the skipped disks, setting occupation state IDs of the disks, and migrating the data on the skipped disks.

In addition, as described above, disk pool 130 includes various types of disks. Storage performance and stability of storage system 110 may be improved by classifying the same type of disks into the same disk group. For this purpose, controller 120 may further determine whether a total capacity not lower than that in a current target scheme can be obtained by using such a candidate scheme (hereinafter referred to as "third candidate scheme") as classifying the same type of disks into the same disk group, thus further optimizing the disk group. In the following, the third candidate scheme will be described with reference to FIG. 6, which illustrates example 600 of a third candidate scheme according to some embodiments of the present disclosure.

Figure 6:
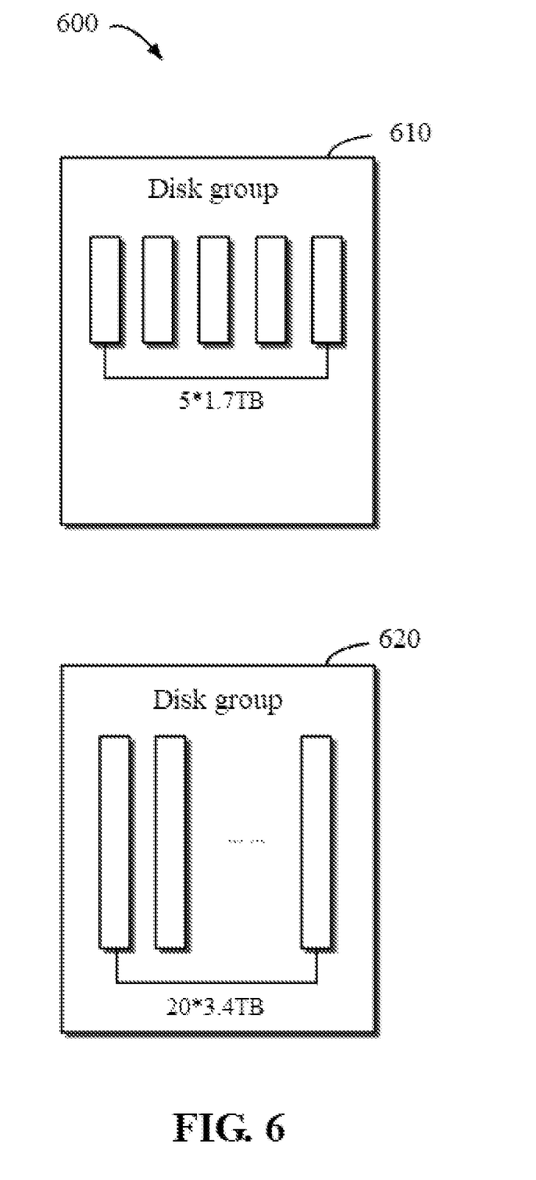
FIG. 6 illustrates an example of a third candidate scheme according to some embodiments of the present disclosure.

In some embodiments, controller 120 may acquire types of the plurality of disks involved in the target scheme. For example, in case that the second candidate scheme is selected as the target scheme, the plurality of disks involved are 20 SAS SSD disks and 5 NVME SSD disks. Controller 120 may determine a third candidate scheme based on the types. Specifically, the plurality of disks involved are classified into at least one disk group in the third candidate scheme. The disks classified into the at least one disk group are of the same type. For example, in the third candidate scheme, the 20 SAS SSD disks are classified into disk group 620, and the 5 NVME SSD disks are classified into disk group 610. Thus, controller 120 may determine, based on an available capacity of the classified at least one disk group, a total capacity associated with the third candidate scheme (hereinafter referred to as "third total capacity"). For example, disk group 610 has 5 NVME SSD disks, among which one NVME SSD disk is used as a spare disk, and therefore, controller 120 can determine that its available capacity is 4×1.7 T=6.8 T. Disk group 620 has 20 SAS SSD disks, among which one SAS SSD disk is used as a spare disk, and therefore, controller 120 can determine that its available capacity is 19×3.4 T=64.6 T. Therefore, the third candidate scheme is 6.8 T+64.6 T=71.4 T.

Controller 120 may update the target scheme based on the third total capacity. Specifically, controller 120 updates the target scheme to the third candidate scheme if controller 120 determines that the third total capacity is greater than or equal to a total capacity of the current target scheme. For example, the total capacity 73.1 T of the current target scheme is greater than the third total capacity 71.4 T, and therefore, controller 120 will not update the target scheme to the third candidate scheme, but still uses the second candidate scheme as the target scheme.

In this way, controller 120 flexibly selects all or part of the disks to generate an optimal disk group, thus achieving a maximum total capacity of the disk group. This can prevent an increase in the capacity caused by the merging of the disk groups after some disks fail, thus avoiding a situation that a disk cannot be added back to the disk group when the disk is recovered. In addition, controller 120 may further classify the same type of disks into the same disk group without affecting the total capacity, so as to improve stability and efficiency of the storage system.

Figure 7:
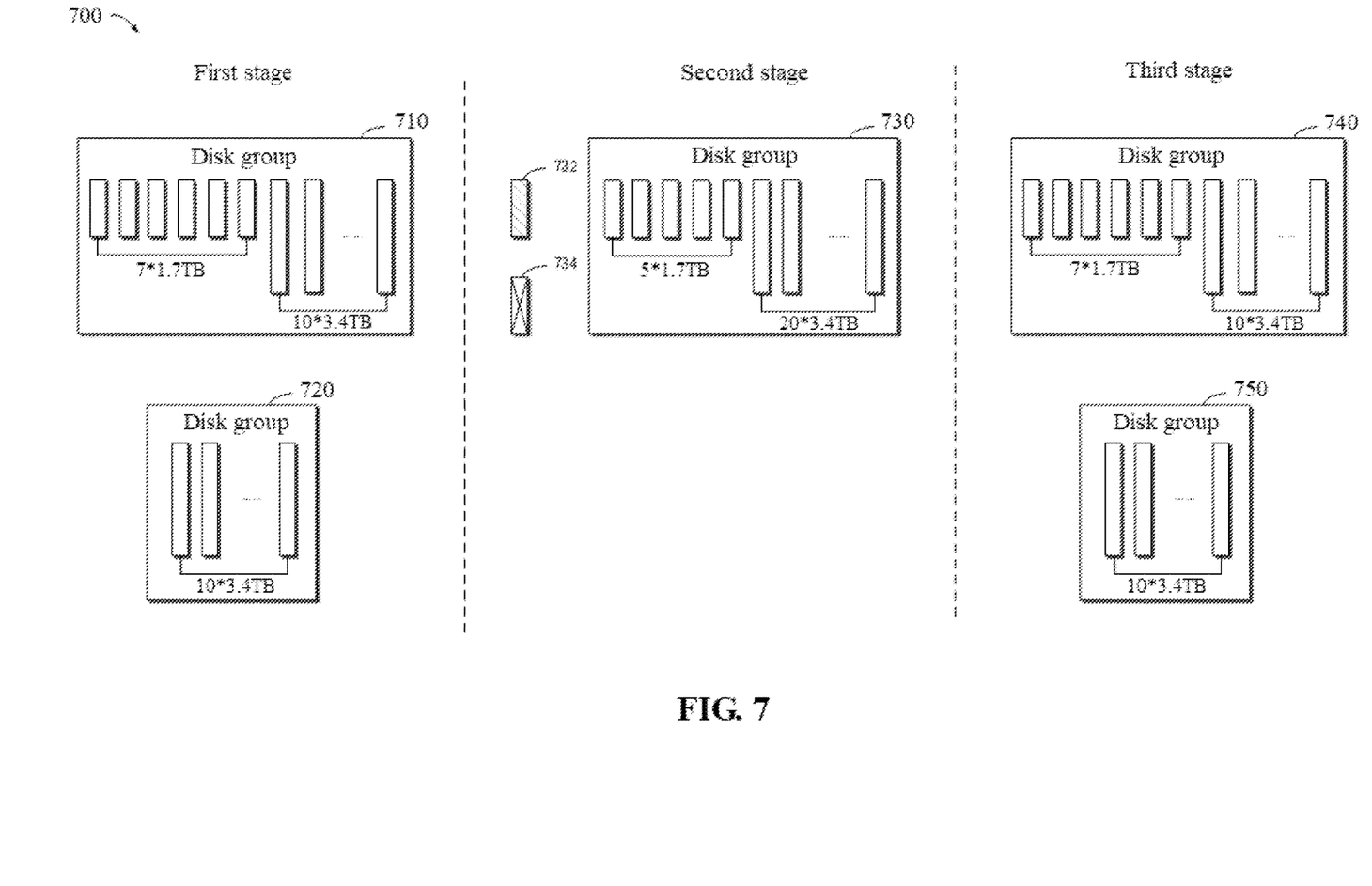
FIG. 7 illustrates an example of storage management according to some embodiments of the present disclosure.

In order to further facilitate understanding, FIG. 7 illustrates example 700 of storage management according to some embodiments of the present disclosure. Initialization of a disk group and changes of active disks are described in detail in the example shown in FIG. 7.

It is assumed that there are initially 27 disks to be grouped, including 7 NVME SSD disks and 20 SAS SSD disks. An available capacity of the NVME SSD disk is 1.7 T, and an available capacity of the SAS SSD disk is 3.4 T.

In a first stage, controller 120 determines to use all the disks to obtain a maximum total capacity. Specifically, all the disks are classified into two disk groups 710 and 720.

Disk group 710 has 10 SAS SSD disks and 7 NVME SSD disks. Disk group 720 has 10 SAS SSD disks.

In a second stage, when one NVME SSD disk 734 fails, there are only 26 active disks in a storage pool. Controller 120 determines that the target scheme is to skip one NVME SSD disk 732 and use the remaining 25 disks to obtain a maximum total capacity. In this case, controller 120 merges the two disk groups 710 and 720 into one disk group 730. In addition, since the skipped disk 732 is an occupied old disk, disk slices located on another disk may be reallocated to a storage array including disk slices located on the old disk, and data in the disk slices on the old disk may also be migrated to the newly allocated disk slices.

In a third stage, when the failed NVME SSD disk 734 is recovered, the controller re-classifies all the disks into two disk groups 740 and 750 to obtain a maximum total capacity. Disk groups 740 and 750 are the same as disk groups 710 and 720 in the first stage. As can be seen, controller 120 groups the disks with a scheme of obtaining a maximum total capacity in each stage, and therefore, when a disk first fails and then is recovered, it will not happen that adding the recovered disk reduces the total capacity and the recovered disk cannot be added back.

Figure 8:
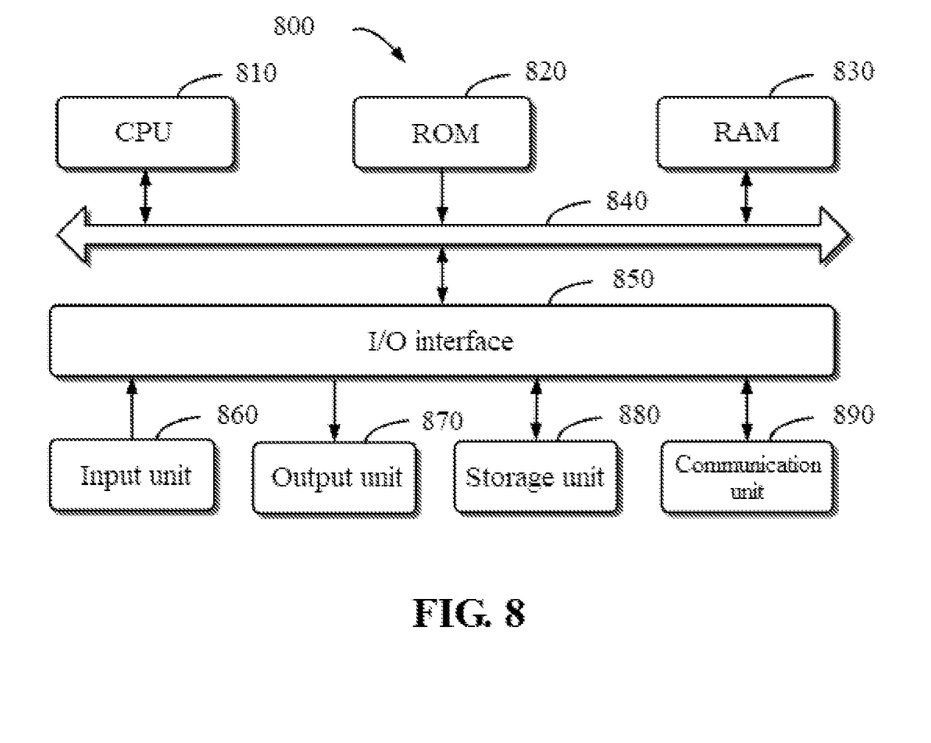
FIG. 8 is a schematic block diagram of an example device that can be configured to implement an embodiment of content of the present disclosure.

FIG. 8 is a schematic block diagram of example device 800 that can be configured to implement an embodiment of content of the present disclosure. For example, controller 120 as shown in FIG. 1 can be implemented by device 800. As shown in the figure, device 800 includes central processing unit (CPU) 810 that may perform various appropriate actions and processing according to computer program instructions stored in read-only memory (ROM) 820 or computer program instructions loaded from storage unit 880 to random access memory (RAM) 830. In RAM 830, various programs and data required for the operation of device 800 may also be stored. CPU 810, ROM 820, and RAM 830 are connected to each other through bus 840. Input/output (I/O) interface 850 is also connected to bus 840.

A plurality of components in device 800 are coupled to I/O interface 850, including: input unit 860, such as a keyboard and a mouse; output unit 870, such as various types of displays and speakers; storage unit 880, such as a magnetic disk and an optical disc; and communication unit 890, such as a network card, a modem, and a wireless communication transceiver. Communication unit 890 allows device 800 to exchange information/data with other devices over a computer network such as the Internet and/or various telecommunication networks.

The various processes and processing described above, for example, method 200, may be performed by processing unit 810. For example, in some embodiments, method 200 may be implemented as a computer software program that is tangibly included in a machine-readable medium such as storage unit 880. In some embodiments, some or all of the computer program may be loaded and/or installed onto device 800 through ROM 820 and/or communication unit 890. When the computer program is loaded into RAM 830 and executed by CPU 810, one or more actions of method 200 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a physical device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagating freely, electromagnetic waves propagating through waveguides or other transmission media (e.g., light pulses propagating through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user computer, partially on a user computer, as a separate software package, partially on a user computer and partially on a remote computer, or completely on a remote computer or server. In the case where a remote computer is involved, the remote computer may be connected to a user computer over any kind of network, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program products according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/ actions specified in one or more blocks in the flowcharts and/or block diagrams. The computer-readable program instructions may also be stored in a computer-readable storage medium, and the instructions cause the computer or another programmable data processing apparatus and/or other devices to work in a specific manner, such that the computer-readable medium storing the instructions includes a manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of the systems, methods, and computer program products according to multiple embodiments of the present disclosure. In this regard, each block in the flowcharts or block diagrams may represent a module, a program segment, or a portion of an instruction that includes one or more executable instructions for implementing the specified logical functions. In some alternative implementations, functions labeled in the blocks may occur in an order different from those as labeled in the accompanying drawings. For example, two successive blocks may actually be performed basically in parallel, or they may be performed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements of technologies on the market, or to enable other persons of ordinary skill in the art to understand the embodiments disclosed herein.

The invention claimed is:

1. A method for storage management, comprising:
acquiring capacities of a plurality of disks configured to provide redundant storage;
determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and
determining a target scheme of the redundant storage from the first candidate scheme and the second candidate scheme based on the first total capacity and the second total capacity.

2. The method of claim 1, wherein acquiring the capacities of the plurality of disks comprises:
acquiring the capacities of the plurality of disks if it is determined to initialize the plurality of disks; and
acquiring the capacities of the plurality of disks if it is determined that the number of active disks in the plurality of disks changes.

3. The method of claim 1, wherein determining the first total capacity comprises:
classifying the plurality of disks into at least one disk group;
determining an available capacity of the at least one disk group; and
determining the first total capacity based on the available capacity of the at least one disk group.

4. The method of claim 3, wherein determining the available capacity of the at least one disk group comprises:
determining a spare disk in the at least one disk group; and
summing the capacities of the disks other than the spare disk in the at least one disk group to determine the available capacity.

5. The method of claim 1, wherein determining the second total capacity comprises:
selecting a predetermined number of disks from the plurality of disks to form a disk group, the predetermined number being associated with a maximum number of disks that can be comprised in the disk group;
determining a spare disk in the disk group; and
summing the capacities of the disks other than the spare disk in the disk group to determine the second total capacity.

6. The method of claim 1, further comprising:
acquiring types of the plurality of disks involved in the target scheme;
determining a third candidate scheme based on the types, the plurality of disks involved being classified into at least one disk group in the third candidate scheme, and the disks classified into the at least one disk group being of the same type;
determining a third total capacity based on an available capacity of the classified at least one disk group; and
updating the target scheme based on the third total capacity.

7. The method of claim 6, wherein updating the target scheme comprises:
updating the target scheme to the third candidate scheme if the third total capacity is determined to be greater than or equal to a total capacity of the target scheme.

8. An electronic device, comprising:
at least one processing unit; and
at least one memory coupled to the at least one processing unit and storing instructions configured to be executed by the at least one processing unit, wherein when executed by the at least one processing unit, the instructions cause the device to perform actions comprising:

acquiring capacities of a plurality of disks configured to provide redundant storage;

determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity.

9. The device of claim 8, wherein acquiring the capacities of the plurality of disks comprises at least one of the following:

acquiring the capacities of the plurality of disks if it is determined to initialize the plurality of disks; and acquiring the capacities of the plurality of disks if it is determined that the number of active disks in the plurality of disks changes.

10. The device of claim 8, wherein determining the first total capacity comprises:

classifying the plurality of disks into at least one disk group;

determining an available capacity of the at least one disk group; and determining the first total capacity based on the available capacity of the at least one disk group.

11. The device of claim 10, wherein determining the available capacity of the at least one disk group comprises:

determining a spare disk in the at least one disk group; and summing the capacities of the disks other than the spare disk in the at least one disk group to determine the available capacity.

12. The device of claim 8, wherein determining the second total capacity comprises:

selecting a predetermined number of disks from the plurality of disks to form a disk group, the predetermined number being associated with a maximum number of disks that can be comprised in the disk group;

determining a spare disk in the disk group; and summing the capacities of the disks other than the spare disk in the disk group to determine the second total capacity.

13. The device of claim 8, wherein the actions further comprise:

acquiring types of the plurality of disks involved in the target scheme;

determining a third candidate scheme based on the types, the plurality of disks involved being classified into at least one disk group in the third candidate scheme, and the disks classified into the at least one disk group being of the same type;

determining a third total capacity based on an available capacity of the classified at least one disk group; and updating the target scheme based on the third total capacity.

14. The device of claim 8, wherein updating the target scheme comprises:

updating the target scheme to the third candidate scheme if the third total capacity is determined to be greater than or equal to a total capacity of the target scheme.

15. A computer program product having a non-transitory computer readable medium which stores a set of instructions to perform storage management; the set of instructions, when carried out by computerized circuitry, causing the computerized circuitry to perform a method of:

acquiring capacities of a plurality of disks configured to provide redundant storage;

determining, based on the capacities of the plurality of disks, a first total capacity corresponding to a first candidate scheme of the redundant storage and a second total capacity corresponding to a second candidate scheme of the redundant storage, all of the plurality of disks being used in the first candidate scheme, and a part of the plurality of disks being used in the second candidate scheme; and determining a target scheme of the redundant storage from the first candidate scheme and the second candidate scheme based on the first total capacity and the second total capacity.

* * * * *